United States Patent
Bantz et al.

(10) Patent No.: US 7,698,706 B2
(45) Date of Patent: Apr. 13, 2010

(54) METHODS AND APPARATUS FOR IMPLEMENTING AN INTEGRATED USER INTERFACE FOR MANAGING MULTIPLE VIRTUAL MACHINES OPERATIVE IN A COMPUTING SYSTEM

(75) Inventors: David F. Bantz, Portland, ME (US);
Thomas E. Chefalas, Somers, NY (US);
Steven J. Mastrianni, Unionville, CT (US); Clifford Alan Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 11/134,750

(22) Filed: May 20, 2005

(65) Prior Publication Data
US 2006/0265711 A1 Nov. 23, 2006

(51) Int. Cl.
*G06F 9/455* (2006.01)
*G06F 9/46* (2006.01)
*G06F 15/173* (2006.01)

(52) U.S. Cl. .............................. 718/1; 718/104; 709/226
(58) Field of Classification Search ...................... 718/1, 718/100, 102, 103, 104; 709/224, 223, 225, 709/226
See application file for complete search history.

(56) References Cited

U.S. PATENT DOCUMENTS

| | | | |
|---|---|---|---|
| 7,313,793 B2 * | 12/2007 | Traut et al. ..................... | 718/1 |
| 7,526,515 B2 * | 4/2009 | Broussard et al. ............ | 707/205 |
| 2003/0120711 A1 * | 6/2003 | Katz ............................. | 709/106 |
| 2005/0060590 A1 * | 3/2005 | Bradley et al. ............... | 713/320 |
| 2005/0120160 A1 * | 6/2005 | Plouffe et al. .................. | 711/1 |
| 2006/0005189 A1 * | 1/2006 | Vega et al. ...................... | 718/1 |
| 2006/0069761 A1 * | 3/2006 | Singh et al. .................. | 709/222 |
| 2006/0136912 A1 * | 6/2006 | Robinson et al. ............... | 718/1 |

OTHER PUBLICATIONS

Choi et al. "Fast Software Component Migration for Applications Survivability in Distributed Real-Time Systems", 2004 IEEE, 8 pages.*
Zhang et al. "Incorporating Job Migration and Network RAM to Share Cluster Memory Resources", 2000 IEEE, pp. 71-78.*
Fu et al. "Migration Decision for Hybrid Mobility in Reconfigurable Distributed Virtual Machines", IEEE 2004, 8 pages.*

* cited by examiner

*Primary Examiner*—Van H Nguyen
(74) *Attorney, Agent, or Firm*—Harrington & Smith

(57) ABSTRACT

Methods and apparatus for managing multiple virtual machines simultaneously operative in a computing environment provide an integrated work environment—for example, a desktop—which incorporates graphical and control elements from multiple virtual machines. In embodiments of the present invention, application programs and resources available in multiple virtual machines can be accessed from a single desktop. Visual cues are provided for associating control elements and resources with particular virtual machines. In embodiments of the present invention, multiple virtual machines operative in a computing environment can comprise a plurality of collaborative virtual machines, or a private virtual machine and one or more collaborative virtual machines.

1 Claim, 3 Drawing Sheets

METHODS AND APPARATUS FOR IMPLEMENTING AN INTEGRATED USER INTERFACE FOR MANAGING MULTIPLE VIRTUAL MACHINES OPERATIVE IN A COMPUTING SYSTEM

TECHNICAL FIELD

The present invention generally concerns methods and apparatus for managing multiple virtual machines operative in a computing system, and more particularly concerns an integrated graphical user interface for managing multiple virtual machine operative in a computing system, where the integrated graphical interface incorporates graphical, control and computer system resources from operating environments associated with multiple virtual machines.

BACKGROUND

When computer users wish to collaborate, the current state of the art is to provide a "collaborative application" mediating the interactions between users. The collaborative application limits what each user can do, in part to prevent one user from corrupting the work of another. But these limits may be intolerable for some collaborative tasks, such as debugging computer software. The current state of the art for such collaborative tasks is to set up a computer dedicated to this task, and back it up frequently so that corruption can be recovered from.

Virtual machine monitor (VMM) software such as VMWare Workstation, available from VMWare of Palo Alto, Calif. runs as an application program on various operating systems, such as Linux and Microsoft Windows®, and creates virtual machines. A virtual machine emulates a hardware processor, including the processing unit, memory, storage devices and networking. Virtual machine technology is now practical for personal computing due to advances in system hardware and software. Processor, memory and storage speed have increased significantly, allowing virtual machines to be used for personal computing without a significant impact on normal productivity. Memory and disk storage have decreased significantly in cost, making virtual machines more attractive.

A virtual machine is said to be isolated from the personal computer it runs on, because it may not change the state of that personal computer, except in certain, very controlled ways. This isolation makes virtual machines ideal for computations which cannot be trusted, such as computations which may be performed by many collaborators in a shared computing environment.

Virtual machines may be shared by multiple users if a multiple user operating system is installed in them. Examples of multiple user operating systems include Linux and Microsoft's Windows Server 2003. Shared virtual machines can support collaboration among their users, by permitting users to share files, execute programs and use collaboration applications, such as Web Servers running Wiki software. Wiki software is described in the web pages of wiki.org and in the book "The Wiki Way: Collaboration and Sharing on the Internet," published by Addison-Wesley Professional, 2001.

Thus, the advent of virtual machines has provided advantages for end users. Nonetheless, this technology has presented several drawbacks. In particular, the proliferation of virtual systems in computing environments presents drawbacks for users who now have to access two or more virtual machine to perform productivity tasks. This can be particularly burdensome since a user may need to switch between or among multiple graphical user interfaces to perform tasks. For example, in one possible implementation in accordance with the prior art, an end user would have to bring a desktop-like operating environment associated with each particular virtual machine into focus every time the user switches from performing tasks in the operating environment associated with one virtual machine to the operating environment associated with another virtual machine.

This can be even more burdensome if tasks are to be performed using both private and collaborative virtual machines at various points. In collaborative virtual machines, authorized changes made to, for example, software under development, would be spawned to all collaborators immediately. A software developer may wish to develop, test and debug a portion of the software in his own private virtual machine before publishing it to collaborators in the collaborative virtual machine. Accordingly, in computing systems in accordance with the prior art, the developer would be required to constantly switch between operating environments associated with the private and collaborative machines in an inefficient and time-consuming series of focus management operations.

Thus, those skilled in the art desire methods and apparatus for implementing a computing environment in which personal and collaborative virtual machines may be simultaneously operative on, and accessed through, a single computing environment. In particular, and most importantly, such a computer system would maintain a strict separation between the operating environments of the private and virtual machines so that changes to the state of either virtual machine would not impact the state of the other virtual machine. This would prevent, for example, a catastrophic failure from propagating from one virtual machine to another.

In addition, those skilled in the art desire that while personal and collaborative virtual machines may be operative on, and accessed through, a single computer system, that access to both the private and collaborative virtual machines be strictly regulated, so only those users with authorization may access the virtual machines. A system operating in this manner would prevent unauthorized users from accessing the virtual machines and changing their states or viewing sensitive information stored within the paradigm of the virtual machines.

Further, those skilled in the art desire a streamlined interface for accessing private and collaborative virtual machines. A system having such an interface would simultaneously display on the interface windows concerning both the private and the collaborative virtual machines. Even more desired is an integrated desktop environment in which applications operative in either one or both the private and virtual machines may be accessed though icons visible in a single desktop. Such a system would provide visual cues to a user indicating in which virtual machine application programs represented by icons on the integrated desktop are operative.

SUMMARY OF THE PREFERRED EMBODIMENTS

A first embodiment of the present invention comprises a signal-bearing medium tangibly embodying a program of machine-readable instructions executable by a digital processing apparatus of a computer system to perform operations concerning at least two virtual machines operative in the computer system, the operations comprising: detecting computer system resources associated with each of the at least two virtual machines; displaying an interactive, integrated graphical user interface on a display device associated with the computer system, whereby the interactive, integrated graphical user interface simultaneously displays graphical elements representing computer system resources associated with each of the at least two virtual machines; receiving commands entered, at least in part, using the integrated, interactive graphical user interface to perform actions on computer system resources associated with each of the at least two virtual machines; and executing actions corresponding to the commands entered using the interactive, integrated graphical user interface on the computer system resources associated with each of the at least two virtual machines while maintaining the independence of the operating environments of each of the at least two virtual machines.

A second embodiment of the present invention comprises a computer system comprising: at least one memory to store at least one program of machine-readable instructions; at least one processor coupled to the at least one memory, where the at least one processor performs at least the following operations when the at least one program is executed: establishing operating environments associated with at least two virtual machines; detecting computer system resources associated with each of the at least two virtual machines; displaying an interactive, integrated graphical user interface on a display device associated with the computer system, whereby the interactive graphical user interface simultaneously displays graphical elements representing computer system resources associated with each of the at least two virtual machines; receiving commands entered, at least in part, using the integrated, interactive graphical user interface to perform actions on computer system resources associated with each of the at least two virtual machines; and executing actions corresponding to the commands entered using the interactive, integrated graphical user interface on the computer system resources associated with each of the at least two virtual machines while maintaining the independence of the operating environments of each of the at least two virtual machines.

Thus it is seen that embodiments of the present invention overcome the limitations of the prior art. In known computing environments implementing multiple virtual machines, application programs and other system resources are not accessible through a single user interface. Instead, a user has to bring a desktop-like operating environment associated with each particular virtual machine into focus every time the user switches from another virtual machine to perform productivity tasks in the active virtual machine.

In contrast, the methods and apparatus of the present invention provide an integrated user interface through which an end user can access application programs and other computer system resources resident in operating environments implemented in several virtual machines. The end user need no longer perform inefficient and time-consuming focus management operations each time the end user switches to an operating environment associated with a previously inactive virtual machine to perform productivity tasks. Instead, application programs and other computer resources associated with several virtual machines can be directly accessed from a single operating environment—for example, a desktop—in the present invention.

In addition, methods and apparatus of the present invention provide useful visual cues to assist users in determining with which virtual machine an application program or other computer system resource is associated. In a desktop environment integrating multiple instances of an application program drawn from several virtual machines it is crucial to provide users with cues so that they can determine with which virtual machine a particular application program is associated. If this did not occur, multiple instances of an application program may be a source of confusion to a user. Methods and apparatus of the present invention through tiling, color-coding and other means distinguish computer system resources by source virtual machine.

Further, methods and apparatus of the present invention allow transactions to occur between at least two separate virtual machines within the context of an integrated work environment. In the prior art, in order to move a computer system resource (e.g., a file) from one virtual machine to another, it was necessary to perform focus management operations on operating environments associated with each of the virtual machines. In methods and apparatus of the present invention, a user can move a computer system resource from one virtual machine to another virtual machine without the burdensome and inconvenient focus management operations. In methods and apparatus of the present invention, this occurs without threat to the stability of the operating environments associated with the separate virtual machines, since permissions are instituted to control transactions between separate virtual machines.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
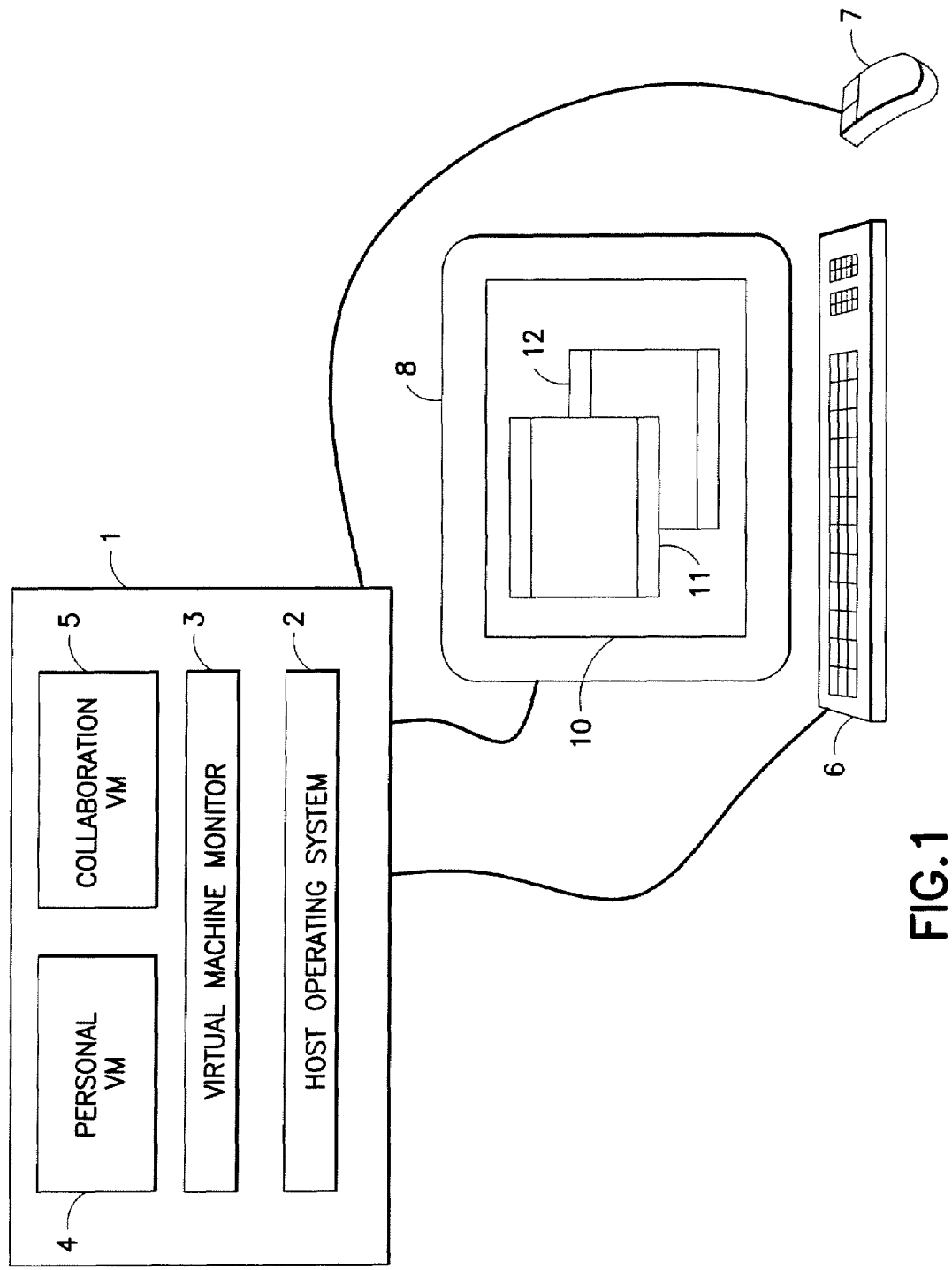
FIG. 1 depicts a system embodying the present invention.

FIG. 1 illustrates a system embodying the subject invention. Personal computer 1 contains an host operating system 2 which runs a virtual machine monitor application 3. This VMM creates two virtual machines, personal virtual machine 4 and shared, collaborative virtual machine 5. Only a single individual user of the personal computer 1 can use personal virtual machine 4, while multiple users of personal computer 1 can use shared, collaborative virtual machine 5.

Also shown in FIG. 1 is display 8, keyboard 6 and mouse 7 all attached to personal computer 1. Users of personal computer 1 may use interactive devices attached directly to personal computer 1, as shown in FIG. 1, or may be remotely attached to personal computer 1 through various software means. Personal computer 1 may have multiple displays, keyboards and mouse devices attached to it.

Shown on display 8 in FIG. 1 is a "desktop," or user interface panel 10, as is familiar to users of Microsoft Windows and to the various interactive environments such as Motif supported by the Linux operating system. Within this panel are shown two windows 11 and 12, which may, for example, be windows permitting interaction with two separate applications. In some cases of VMM 3 each window may enable viewing a personal computing environment contained in a single virtual machine. Alternatively, in "full-screen mode," a personal computing environment contained in a single virtual machine may create desktop panel 10, with windows 11 and 12 permitting interaction with two separate applications, both running within the same virtual machine. These are the only modes of use in current practice, and neither reflects an integrated view of private and collaborative environments.

Preferably, in the subject invention, desktop 10 represents the desktop of a composite computing environment consisting of computations in both virtual machines 4 and 5 of FIG. 1. In this mode of use, for example, window 11 might represent an application running in virtual machine 5. A given user of personal computer 1 would see an integrated view of the personal computing environments of both virtual machines. Because of the isolation properties of virtual machines, computations initiated in virtual machine 5 cannot affect virtual machine 4 and vice versa. Thus if collaborators were to initiate dangerous computations in virtual machine 5 these could not corrupt the user's personal computing environment in virtual machine 4.

Figure 2:
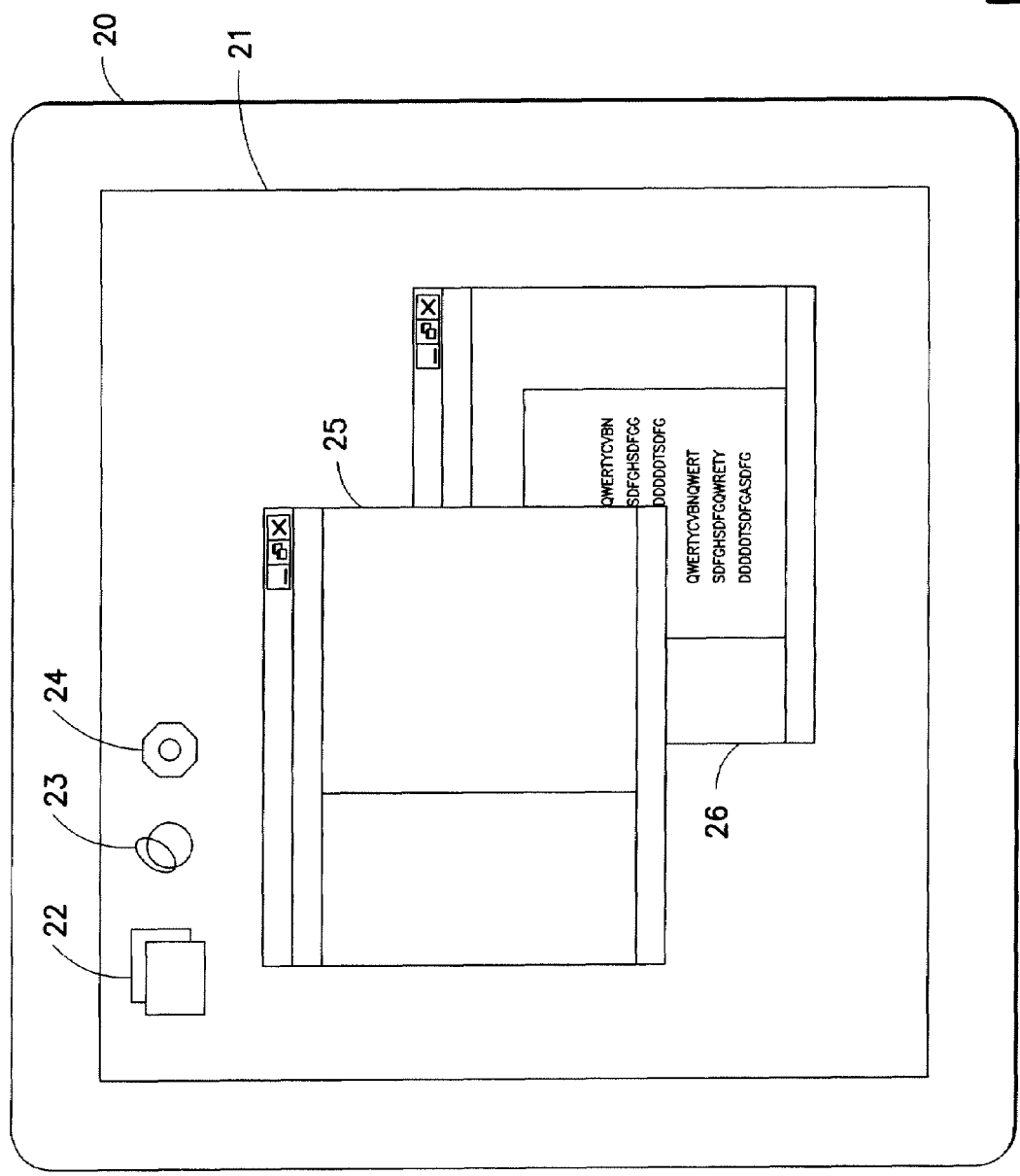
FIG. 2 depicts a graphical user interface operating in accordance with the present invention.

FIG. 2 depicts the user interface in more detail. Display 20 displays desktop 21. Desktop 21 contains desktop icons 22, 23 and 24 and windows 25 and 26. Icons 22, 23 and 24 may represent resources in either the personal virtual machine 4 of FIG. 1 or the collaboration virtual machine 5 of FIG. 1. Preferably, icons 22, 23 and 24 and windows 25 and 26 incorporate some visual feature as to whether they represent resources in a personal virtual machine or a collaborative virtual machine. These visual features serve as a visual cue to the end user, so that the end user will know whether it is his or her personal computing environment or collaborative environment that is the target of a given interaction. Visual features include a color or color scheme, a texture or texture scheme, or a graphical or textual element such as mark or character.

It is seen from FIG. 2 that the user interface to the subject invention provides a convenient, uniform interface to both personal and collaborative environments in personal and collaborative virtual machines. Virtual machine software such as VMW are Workstation can support the drag and drop function between virtual machines, so the user interface of FIG. 2 can also support this function.

Figure 3:
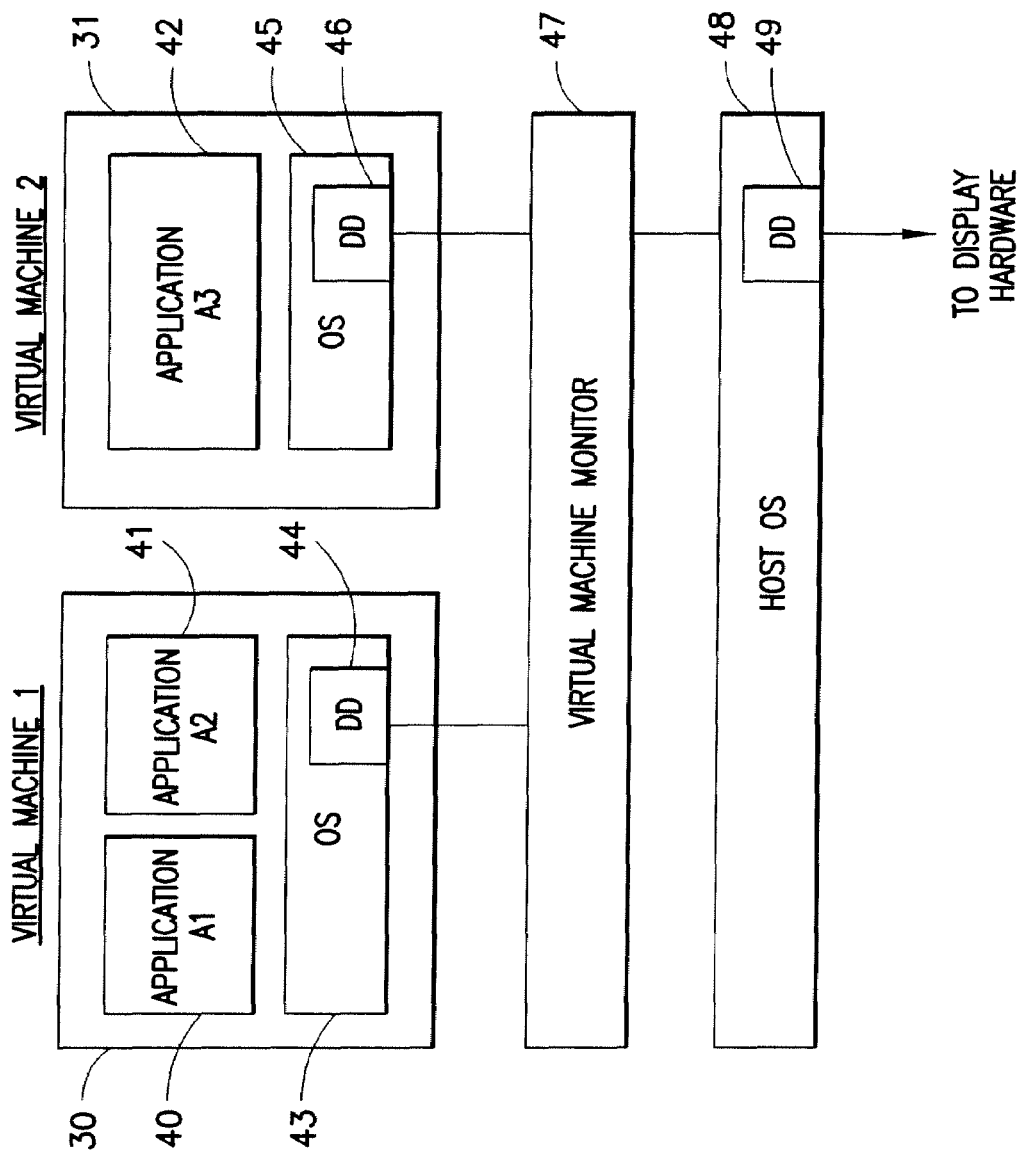
FIG. 3 depicts in schematic terms the organization of software implementing the present invention.

FIG. 3 depicts the configuration of software wherein a virtual machine monitor supports more than one virtual machine. Host operating system 48 supports virtual machine monitor 47 which, in turn, creates virtual machines 30 and 31. Virtual machine 30 runs guest operating system 43 supporting applications 40 and 41. Virtual machine 31 runs guest operating system 45 supporting application 42. Also shown in the figure are guest operating system device drivers 44 and 46, and host operating system device driver 49, each supporting display operations.

In operation, application 40, say, calls graphic services of guest operating system 43 to update the contents of its window. Similarly, guest operating system 43 may call its own graphic services to update the contents of its desktop. These graphic service result in calls to device driver 44. Virtual machine monitor 47 captures the output of device driver 44 and, in turn, uses that output to control calls to the graphic services of host operating system 48. Those graphic services result in calls to device driver 49, whose output is used to control the display hardware of the computer on which all of the software of FIG. 3 runs. Host operating system 48 also makes calls to its own graphic services to update its own desktop. The desktop of the host operating system 48 is not shown in FIG. 3, because to do so would require further integration between the personal computing environments supported by both virtual machines and the personal computing environment supported by the host operating system 48. This integration can be performed by means of the subject invention, but will not be further described here for reasons of simplifying the description.

Virtual machine monitor 47 cannot distinguish calls made to the graphic services of guest operating system 43 for the purpose of updating an application window form those calls made to update the desktop. This is because there is no identifying information available in the output of guest operating system device driver 44. In order to provide a uniform interface to both personal and collaborative virtual machines, as is required by the subject invention, host operating system 48 must receive calls to its graphic services wherein the desktops of guest operating system 43 and guest operating system 45 are merged, and wherein application windows for applications 40, 41 and 42 appear on the common desktop.

In a preferred embodiment of the subject invention, device drivers 44 and 46 are replaced with new device drivers, whose output contains information distinguishing graphical operations on application windows and on desktops. Guest operating systems 43 and 45 graphic services are enhanced to pass identifying information so that a single, uniform desktop is created. It will now be described how such enhancements can be done.

Thus it is seen that the foregoing description has provided by way of exemplary and non-limiting examples a full and informative description of the best method and apparatus presently contemplated by the inventors for implementing an integrated user interface for managing multiple virtual machines simultaneously operative in a computing system. One skilled in the art will appreciate that the various embodiments described herein can be practiced individually; in combination with one or more other embodiments described herein; or in combination with graphical interfaces differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A method, comprising:

detecting computer system resources associated with each of at least two virtual machines of a computer system, where at least one of the at least two virtual machines is one of a private virtual machine and a collaborative virtual machine;

displaying an interactive, integrated graphical user interface on a display device associated with the computer system, where the interactive, integrated graphical user interface simultaneously displays graphical elements representing the detected computer system resources associated with each of the at least two virtual machines;

receiving commands entered, at least in part, using the integrated, interactive graphical user interface to perform actions on the detected computer system resources associated with each of the at least two virtual machines; and executing actions corresponding to the commands entered using the interactive, integrated graphical user interface on the detected computer system resources associated with each of the at least two virtual machines while maintaining the independence of the operating environments of each of the at least two virtual machines;

where receiving commands comprises receiving a command entered, at least in part, using the interactive, integrated graphical user interface to move at least one of the detected computer system resources from an operating environment associated with a first of the at least two virtual machines to an operating environment associated with a second of the at least two virtual machines; and where executing actions comprises moving the at least one of the detected computer system resources from the operating environment associated with the first of the at least two virtual machines to the operating environment associated with the second of the at least two virtual machines, where the step of moving comprises determining if the command to move the at least one of the detected computer system resources from the operating environment associated with the first of the at least two virtual machines to the operating environment associated with the second of the at least two virtual machines accords with permissions instituted to control interactions between the first and second virtual machines, where moving the at least one of the detected computer system resources occurs only in a case where the permissions allow the movement.

* * * * *